United States Patent [19]

Link et al.

[11] E Patent Number: Re. 33,262

[45] Reissued Date of Patent: Jul. 17, 1990

[54] AUTOMATED TURRET LATHE

[75] Inventors: Helmut F. Link, Aichwald; Walter Grossmann, Baltmannsweiler, both of Fed. Rep. of Germany

[73] Assignee: Index Werke Komm.-Ges Hahn & Tessky, Esslingen, Fed. Rep. of Germany

[21] Appl. No.: 181,212

[22] Filed: Apr. 13, 1988

Related U.S. Patent Documents

Reissue of:

[64] Patent No.: 4,589,311
Issued: May 20, 1986
Appl. No.: 549,346
Filed: Nov. 4, 1983

[30] Foreign Application Priority Data

May 4, 1983 [DE] Fed. Rep. of Germany ..... 3316288

[51] Int. Cl.[5] ..... B23B 29/32; B23B 13/04

[52] U.S. Cl. ..... 82/120; 82/124; 82/129

[58] Field of Search ..... 82/2.5, 2 R, 3, 36 A, 82/117, 120, 124, 129, 159

[56] References Cited

U.S. PATENT DOCUMENTS

| | | | |
|---|---|---|---|
| 2,473,306 | 6/1949 | Schreiber | 82/3 |
| 2,605,538 | 8/1952 | Cuttat | 82/2.5 |
| 3,664,215 | 5/1972 | Selby | 82/2.5 |
| 3,710,466 | 1/1973 | Williamson et al. | 82/36 A |
| 3,943,802 | 3/1976 | Luebkemann et al. | 82/36 A |
| 4,058,034 | 11/1977 | Lahm et al. | 82/36 A |
| 4,457,193 | 7/1984 | Matthey | 82/3 |

FOREIGN PATENT DOCUMENTS

| | | | |
|---|---|---|---|
| 1264927 | 3/1968 | Fed. Rep. of Germany . | |
| 2440368 | 3/1976 | Fed. Rep. of Germany . | |
| 53/33262 | 8/1978 | Japan . | |
| 119302 | 9/1981 | Japan | 82/36 A |
| 58/10401 | 1/1983 | Japan . | |
| 882703 | 11/1981 | U.S.S.R. | 82/36 A |
| 2061159 | 5/1981 | United Kingdom | 82/2.5 |
| 1605146 | 2/1982 | United Kingdom . | |

*Primary Examiner*—William Terrell
*Attorney, Agent, or Firm*—Leydig, Voit & Mayer

[57] ABSTRACT

Automatic turret lathe with a synchronous spindle in the tool turret which is drivable in synchronism with the main spindle and comprises a workpiece chuck means. To enable workpieces to also be worked on the rear side, i.e., on the side on which they were severed from a stock rod, while the next workpiece held in the main spindle is already being machined with the aid of a further tool carrier, a third tool carrier is arranged on the side of the tool turret mounted on a compound slide system facing away from the main spindle.

14 Claims, 3 Drawing Sheets

AUTOMATED TURRET LATHE

Matter enclosed in heavy brackets [ ] appears in the original patent but forms no part of this reissue specification; matter printed in italics indicates the additions made by reissue.

The invention relates to an automatic turret lathe with a main spindle comprising a first workpiece chuck means, a tool turret displaceable parallel to the main spindle axis, and a further tool carrier displaceable vertically to the main spindle axis, wherein at least one station of the tool turret has a second workpiece chuck means mounted at the tool turret for rotation about an axis (synchronous spindle axis) and drivable in synchronism with the main spindle, and is so positionable by adjustment of the tool turret that the synchronous spindle axis is aligned with the main spindle axis. "Flush" both here and hereinafter does not necessarily mean "coaxially" since parallelism may also prevail.

Such cam controlled automatic turret lathes equipped with a so-called synchronous device in the turret head are already known (e.g. automatic turret lathes of the types INDEX C 19 and INDEX C 29 of the applicant company), for cutting-off, i.e., severing a machined workpiece smoothly, i.e., without an undesired projection, from a stock rod. To this end, the machined workpiece is gripped by the workpiece chuck means which is provided in the tool turret and is driven in synchronism with the main spindle via a mechanical gear. After the workpiece has been severed from the stock rod, the tool turret is indexed [on] *one* station further about its axis of rotation. The workpiece remains in the workpiece chuck means of the tool turret until, after several rotational indexing steps of the tool turret, it has been swivelled through a total of 180°, whereupon the workpiece chuck means is opened and the workpiece is conveyed by a resilient ejector held in the turret into a groove via which the workpieces are transported out of the machining area of the automatic lathe. In these known automatic lathes, the synchronous device can, however, also be used for performing simple machining on the cut-off side of the workpiece; to this end, the workpiece chuck means of the tool turret is driven further after the workpiece has been cut-off from the stock rod, and the workpiece is then machined by a tool which is held by a tool carrier which like the tool carrier for the cutting-off tool is arranged beside the main spindle workpiece chuck means. While this work is being performed, a new workpiece cannot be machined since the stock rod is unable to be pushed forward during this time.

The known synchronous device does, however, also have a further disadvantage: the workpiece is gripped in the turret workpiece chuck means by the tool turret being displaced parallel to the main spindle axis and an actuating member of the chuck means which is mounted at the tool turret coming to rest against a stop member. While a workpiece on which the machining has actually been completed is gripped in the turret workpiece chuck means, a relative motion therefore necessarily occurs between the workpiece still held on the stock rod and this workpiece chuck means.

The object underlying the invention was to provide an automatic turret lathe with a so-called synchronous device, with which a workpiece can be machined on the rear side, i.e., on the side on which it was severed from the stock rod, while the next workpiece held in the main spindle workpiece chuck means is already being machined.

Departing from an automatic lathe of the kind mentioned at the outset, this object is attained by a third tool carrier being arranged on the side of the tool carrier in the form of a tool turret facing away from the main spindle, and by at least one of these two tool carriers being mounted on a compound slide displaceable parallel and vertically to the main spindle axis. The solution according to the invention may be applied with special advantage to NC automatic turret lathes as they enable in a simple way rotation of the tool turret through several stations at once after a workpiece has been cut-off, so that the machining of the next workpiece in the main spindle workpiece chuck means is not hindered so long as the workpiece previously manufactured is being machined by one or several tools of the third rear tool carrier. The arrangement of the tool turret or the third tool carrier on a compound slide also enables motion of the workpiece held in the turret workpiece chuck means in any direction with respect to the rear tool carrier, so that the most varied kinds of machining may be performed.

A preferred embodiment of an NC automatic turret lathe according to the invention comprises two tool turrets each arranged on one compound slide, with the tool turret which is located approximately in front of the main spindle, in the direction of the main spindle axis, being provided with the synchronous device, while the cutting-off is performed with the second tool turret located approximately beside the main spindle axis.

It is also advantageous for the third, rear tool carrier to be so arranged that, e.g., an inside machining tool insertable in it and the synchronous spindle axis are so alignable with respect to one another, that they flush with one another. For then a workpiece which has just been cut-off can also be machined with a stationary inside machining tool held in the rear tool carrier.

The statement above that the third tool carrier ought to be on the side of the tool turret facing away from the main spindle does not mean that the third tool carrier is located opposite the main spindle workpiece chuck means with respect to the tool turret; this is firstly not the case if the axis of rotation of the tool turret forms an angle other than a right-angle with the main spindle axis, and, secondly, the third tool carrier may also be so arranged that a workpiece held in the turret workpiece chuck means can already be machined with it if the turret, after the cutting-off of this workpiece, was turned through an angle of less than 180°, since it is only necessary to swivel the workpiece which has just been cut-off out of the area in front of the main spindle workpiece chuck means. A construction wherein a workpiece which has just been cut-off is machinable by a tool held by the third tool carrier after a rotation of the tool turret through approximately 180° is, however, preferable.

As already mentioned, in the known automatic turret lathe with a synchronous device, the turret workpiece chuck means is coupled to the main spindle mechanically, namely via a gear. In the case of an automatic lathe according to the invention it is, however, recommendable for the turret workpiece chuck means to have a separate drive motor which is electrically synchronizable with the main spindle so as to enable the machining of a workpiece with a tool of the third tool carrier to be performed independently of the machining of the workpiece held by the main spindle. It is particularly recommendable to have the turret workpiece chuck means driven by a direct current motor.

In a preferred embodiment of the automatic lathe according to the invention, the second workpiece chuck means, i.e., the turret workpiece chuck means, is a pressure medium [acutated] *actuated* chuck means, and a hydraulic actuation is particularly recommendable. In this way, the disadvantage of the known synchronous device is avoided, namely that while a workpiece is gripped in the turret workpiece chuck means, the latter is displaced relative to the workpiece. Furthermore, the turret workpiece chuck means is actuatable independently of the position of the turret slide, which is not the case with the synchronous device of the known automatic lathes described at the outset and is of considerable advantage in connection with the ejection of a [machine] *machined* workpiece.

As already mentioned, the invention is not only applicable to automatic lathes wherein the axis of rotation of the tool turret extends at right angles to the main spindle axis since, in particular, in NC automatic lathes, the simultaneous displacement of the turret slide along both axes of the compound slide system creates no difficulties. If the tool turret axis of rotation is inclined at an angle $\alpha$ with respect to the main spindle axis, it is expedient to align the third tool carrier such that a machining tool insertable in it forms an angle of $(180°-2\alpha)$ with the main spindle axis, to, e.g., be able to bore with a stationary boring appliance and driven turret workpiece chuck means.

Finally, it may be recommendable to provide the third, rear tool carrier with several tool receptors and/or with a rotatable and drivable tool receptor so as to be able to drive an insertable tool or an insertable tool holder.

Further features, advantages and details of the invention are apparent from the enclosed claims and/or from the ensuing description and also from the attached drawings of two particularly advantageous embodiments of an automatic lathe according to the invention.

Figure 2:
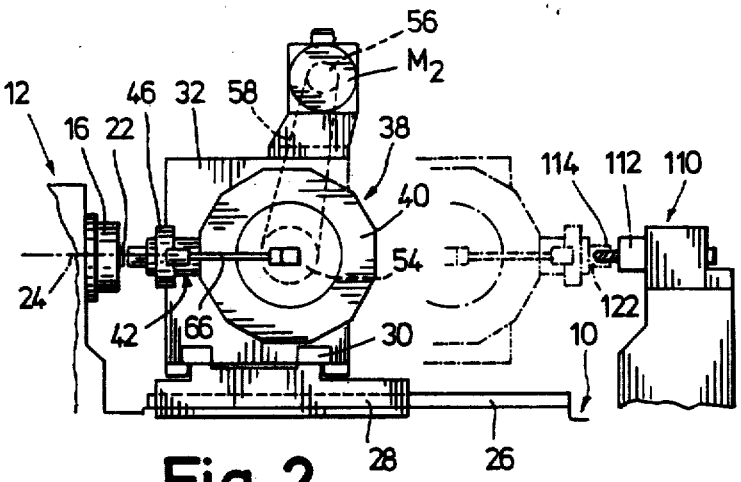
FIG. 2 is a front view of the structural components shown in FIG. 1, seen in the direction of the arrow A in FIG. 1.
Figure 4:
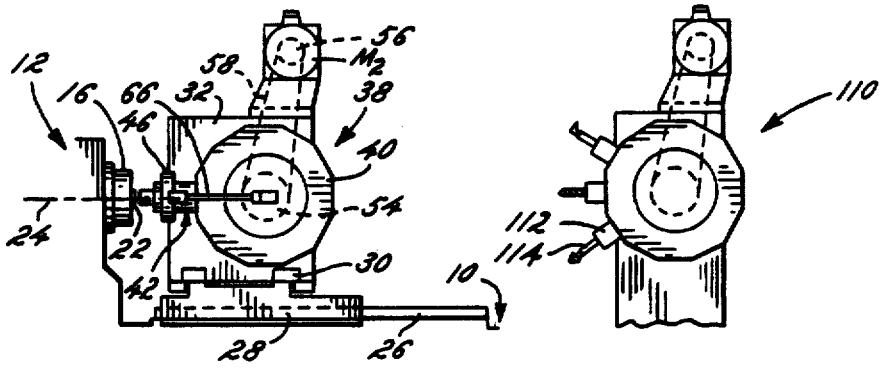

*FIG. 4 corresponds substantially to FIG. 2, but shows another embodiment of the invention with the stationary third tool carrier comprising a tool turret.*

Figure 1:
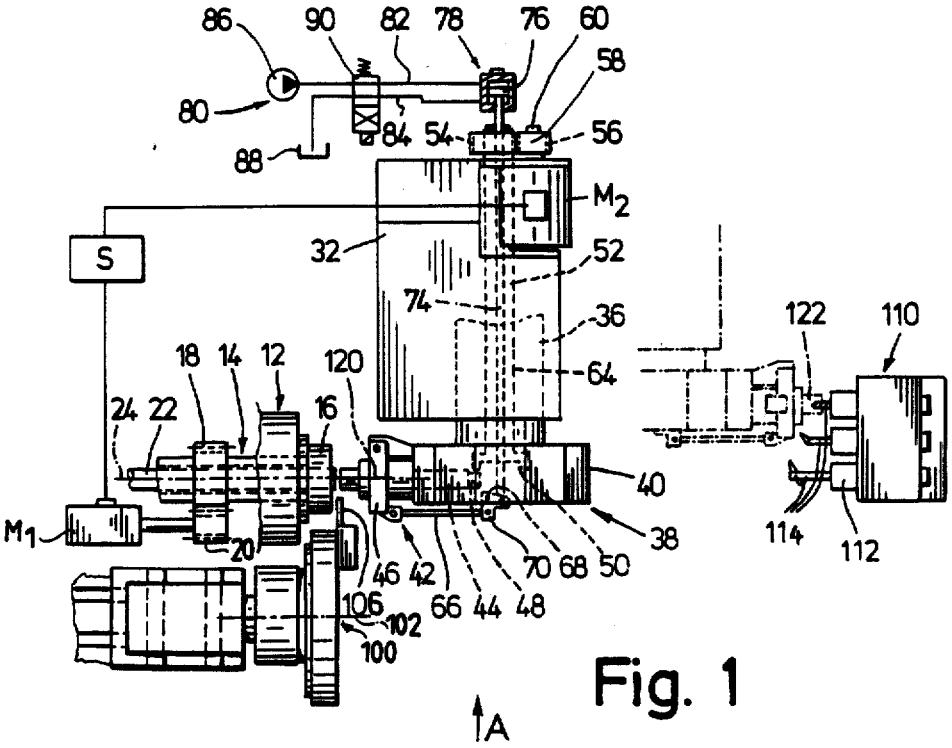
FIG. 1 is a schematic top view of the structural components of an automatic NC turret lathe according to the invention which are affected by the invention.

FIGS. 1 and 2 show a machine bed 10 and a headstock 12 of the automatic lathe. Mounted for rotation in the latter is a main spindle 14 which comprises at its front end a workpiece chuck means 16 in the form of a conventional collet chuck and which is, furthermore, provided with a gear ring 18 via which and a drive pinion 20 it is driven by a first direct current motor $M_1$. The main spindle 14 takes the form of a hollow shaft, which enables a stock rod 22 to be pushed through it and the workpiece chuck means 16. The main spindle axis was designated 24.

On the machine bed 10 there are Z guides 26 which extend parallel to the main spindle axis 24 and on which a lower slide 28 of a compound slide system is slidably guided. The lower slide comprises X guides 30 which extend horizontally and vertically to the Z guides and along which an upper slide 32 of the compound slide system is slidably guided vertically to the drawing plane. In accordance with a standard feature of automatic NC turret lathes, a separate drive, not illustrated, is provided for the drive of the lower slide and the upper slide 28 and 32, respectively.

Mounted for rotation in the upper slide 32 in a manner not illustrated is a turret indexing shaft 36. Associated with the turret indexing shaft are drive means, also not illustrated, to enable it to be rotated in the upper slide 32. The angle of rotation position of the turret indexing shaft 36 can be monitored by a resolver or the like and set with the aid of the machine tool control. The turret indexing shaft comprises at its front end a tool turret 38 with a turret head 40 which, as is apparent from FIG. 2, comprises a twelve-cornered cross-section and, therefore, has twelve stations, so that the tool turret can be indexed one respective station further by rotation of the turret indexing shaft 36 through 30°. In one of these stations there is a synchronous device 42 consisting substantially of a so-called synchronous spindle 44 mounted for rotation in the turret body 40 and of a workpiece chuck means 46, for example, in the form of a collet chuck, carried by the synchronous spindle. At its inside end, the synchronous spindle 44 carries a pinion 48 which engages with a crown wheel 50 which is a component of a drive shaft 52 mounted for rotation in the turret indexing shaft 36. The drive shaft carries at its rear end a crown gear 54 over which and a second crown gear 56 there extends a toothed belt 58. The crown gear 56 sits on the shaft 60 of a second direct current motor $M_2$ which, like the motor $M_1$, is electrically connected to a control S so that, in accordance with the invention, the main spindle 14 and the synchronous spindle 44 are synchronously drivable.

The turret workpiece chuck means 46 is actuated by two rods 64 and 66 which are articulated at an angle 70 hinged to the turret body 40 at 68, and the first of which is arranged for longitudinal displacement in the drive shaft 52 in the form of a hollow shaft. The axis of the drive shaft 52 coincides with the indexing axis 74 of the tool turret 38. The rear end of the rod 64 carries the piston 76 of a stationary, double-acting hydraulic cylinder 78 which is connected to a hydraulic system 80 via two leads 82 and 84.

The hydraulic system includes a pump 86, a tank 88 and a 4-path-valve 90 so that the rod 64 can be pushed forward and back in the direction of the turret indexing axis 74. The workpiece chuck means 46 can be closed and opened by the corresponding motions of the rod 66. Since correspondingly actuated collet chucks are known, it is unnecessary to provide a detailed description or a drawing of the workpiece chuck means 46.

Finally, the automatic lathe comprises a second tool turret [10] *100* with an indexing axis 102 mounted on a compound slide system [, not illustrated,] (*126, 128, 130, 132*) and arranged in the headstock 12, so that it is displaceable in a known way in the drawing plane of FIG. 1 vertically to the main spindle axis 24 and [vertically to the drawing plane] *parallel thereto*. Of the tools of this second tool turret, only a cutting-off tool 106 is shown in FIG. 1.

In accordance with the invention, the automatic lathe comprises in addition to the tool turrets 38 and 100 a third, rear tool carrier 110, which may be stationarily secured to the machine bed 10 and have, for example, three tool receptors 112 for various tools 114. In the embodiment shown in FIGS. 1 and 2, the axes of the tool receptors 112 extend parallel to the main spindle axis 24 and are located on the same level as it, as is apparent from FIG. 2.

The automatic lathe according to the invention may be used as follows: After the front end of the stock rod 22 protruding from the main spindle workpiece chuck means 16 has been machined by tools, not illustrated, of the tool turrets 38 and/or 100, the tool turret 38 is positioned by displacement of its compound slide system 28, 32 and by rotation about its indexing axis 74 so that the axis 120 of the synchronous spindle 44 is flush with the main spindle axis 24, whereupon, with the workpiece chuck means 46 open, the tool turret 38 is pushed forward along the Z axis so far in the direction towards the main spindle workpiece chuck means 16 that the workpiece 122 formed by the front stock rod end enters the synchronous device 42. The synchronous spindle 44 is then driven synchronously with the main spindle 14 with the aid of the direct current motor $M_2$ and the workpiece is gripped in the chuck means 46, whereupon it can be cut-off smoothly, i.e., without a projection, from the stock rod 22 with the aid of the tool 106. Subsequently, the tool turret 38 is rotated through 180°, so that after the chuck means 16 opens, the stock rod 22 can immediately be pushed forward slightly so as to machine a new workpiece with tools of the tool turret 100. If the previously cut-off workpiece 122 is to be subjected to further machining on the rear side, for example, provided with a bore, the tool turret 38 is moved by its compound slide system up to the third tool carrier 110, as is apparent from FIGS. 1 and 2, so as to make a [corresonding] *corresponding* bore with the aid of one of the tools 114 with the synchronous spindle 44 in driven operation. The rear side of the workpiece 122 may, of course, also be machined in a different way; for example, it would be possible to turn the rear end face of the workpiece by the tool turret 38 being made to pass by a turning chisel held by the tool carrier 110 in the direction of the X axis with the synchronous spindle 44 in running operation.

It is, of course, also conceivable to place the tool carrier 110 on a compound slide system so that with the aid of tools of the tool turret 38 both a workpiece held by the chuck means 16 and a previously cut-off workpiece can be machined with the aid of the tools of the tool carrier 110. Furthermore, the third tool carrier can take the form of an indexable tool carrier, in particular, a tool turret (*FIG. 4*). If the third tool carrier rests on a compound slide system, it is adequate for the tool [turrent] *turret* 38 to be displaceable solely parallel to the main spindle axis 24.

Figure 3:
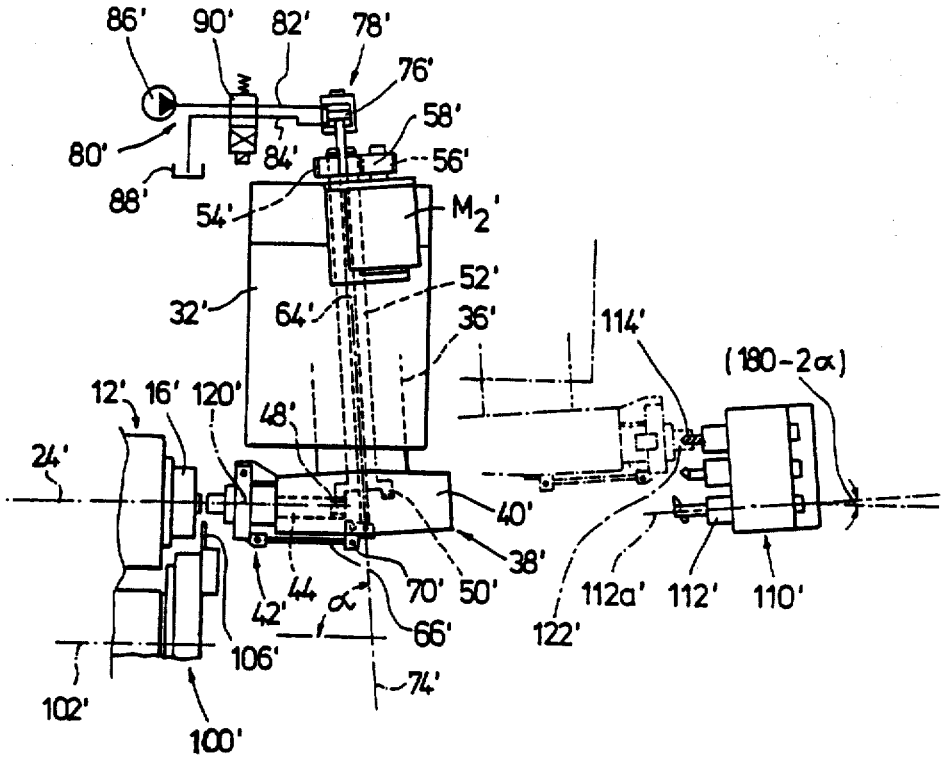
FIG. 3 is a presentation corresponding to FIG. 1 of a second embodiment with a tool turret axis of rotation extending at an incline to the main spindle axis [.] *; and*

The same reference numerals were used for the second embodiment shown in FIG. 3 as in FIGS. 1 and 2, but with the addition of a prime. This second embodiment differs from the first described one only in that the turret indexing axis 74' forms with the main spindle axis 24' not a right-angle but an acute angle $\alpha$; accordingly, the axis of the synchronous spindle 44' also forms with the indexing axis 74' the same angle $\alpha$. In accordance with the invention, the third tool carrier 110' is so oriented relative to the main spindle axis 24' that the axes 112a' of its tool receptors 112' form with the main spindle axis 24' an angle $(180°-2\alpha)$ so that the axis of the synchronous spindle 44' after an indexing motion of the tool turret 38' through 180° can be made to be flush with the axis 112a' of one of the tool receptors.

As is apparent from a turning chisel and a boring bar in FIG. 1, the synchronous spindle axis 120 and the tool 114 which is just being employed do not have to be coaxially flush with one another-this is only the case with a simple stationary boring appliance 114 and the synchronous spindle 44 in driven operation. From a boring bar on, an approximate parallelism to the synchronous spindle axis 120 is sufficient, and a turning chisel may be oriented in any way with respect to this axis.

What is claimed is:

1. An automatic turret lathe comprising a main rotatable spindle; means for rotatably mounting said spindle for rotation about a main spindle axis; drive means associated with said main spindle for rotatably driving the same about said main axis; a first workpiece chuck means associated with said main spindle and rotatable therewith; a first tool carrier comprising a tool turret rotatably mounted about an indexing axis; a second workpiece chuck means mounted on the first tool carrier turret for rotation about an auxiliary spindle axis; a second tool carrier for machining a workpiece held by said first chuck means located adjacent the latter for movement relative to a workpiece held by the first chuck means; a stationary third tool carrier disposed on the side of said first tool carrier facing away from said first chuck means; said third tool carrier carrying a plurality of tool holders; and cross slide means on which said first tool carrier is rotatably mounted for movement of said turret along axes normal and parallel to said main spindle axis so that by appropriate adjustment of said slide means and appropriate indexing of said tool turret said auxiliary spindle axis can be brought into axial alignment with said main spindle axis and a workpiece held by said second chuck means may approach each of said tool holders of the third tool carrier.

2. The automatic lathe according to claim 1, in which the *indexing* axis [of rotation] of the first tool carrier *turret* is inclined at an angle $\alpha$ relative to the main spindle axis, [ad] *and* a [machining] tool *held by* [mounted in] the [second] *third* tool carrier forms an angle of $180°-2\alpha$ with the main spindle axis.

3. The automatic lathe according to claims 1 or 2 in which the [second] *third* tool carrier has a rotatable and drivable tool holder.

*4. The automatic lathe according to claim 1 in which the stationary third tool carrier comprises an indexable tool turret.*

*5. An automatic turret lathe comprising a main rotatable spindle; means for rotatably mounting said spindle for rotation about a main spindle axis; drive means associated with said main spindle for rotatably driving the same about said main axis; a first workpiece chuck means associated with said main spindle and rotatable therewith; a first tool carrier comprising a tool turret rotatably mounted about an indexing axis; a second workpiece chuck means mounted on the first tool carrier turret for rotation about an auxiliary spindle axis; a second tool carrier for machining a workpiece held by said first chuck means located adjacent the latter for movement relative to a workpiece held by the first chuck means; a stationary third tool carrier disposed on the side of said first tool carrier facing away from said first chuck means; said third tool carrier carrying at least one tool holder; and cross slide means on which said first tool carrier is rotatably mounted for movement of said turret along axes normal and parallel to said main spindle axis so that by appropriate adjustment of said slide means and appropriate indexing of said tool turret*

*said auxiliary spindle axis can be brought into axial alignment with said main spindle axis and a workpiece held by said second chuck means may approach each tool holder of the third tool carrier.*

*6. The automatic lathe according to claim 5, in which the indexing axis of the first tool carrier turret is inclined at an angle α relative to the main spindle axis, and a tool held by the third tool carrier forms an angle of 180° − 2α with the main spindle axis.*

*7. The automatic lathe according to claims 5 or 6 in which the third tool carrier has a rotatable and drivable tool holder.*

*8. The automatic lathe according to claim 5 in which the stationary third tool carrier comprises an indexable tool turret.*

*9. The automatic lathe according to claim 5 in which said third tool carrier carries a plurality of tool holders each of which can be approached by a workpiece held by said second chuck means by appropriate adjustment of said cross slide means and appropriate indexing of said first tool carrier turret.*

*10. An automatic turret lathe comprising a machine bed; a main rotatable spindle; means for rotatably mounting said spindle for rotation about a main spindle axis; first drive means associated with said main spindle for rotatably driving the same about said main axis; a first workpiece chuck means associated with said main spindle and rotatable therewith; a first tool carrier comprising a tool turret rotatably mounted about an indexing axis; first cross slide means mounted on said bed on a first side of said main spindle axis, said tool turret being mounted on said first cross slide means for movement thereof along axes parallel to said main spindle axis and normal thereto; a second workpiece chuck means mounted on the first tool carrier turret for rotation about an auxiliary spindle axis; second drive means associated with said second chuck means for rotatably driving the same about said auxiliary spindle axis; a second tool carrier for machining a workpiece held by said first chuck means located adjacent the latter; second cross slide means mounted on said bed on a second side of said main spindle axis, said second tool carrier being mounted on said second cross slide means for movement thereof relative to a workpiece held by the first chuck means along axes parallel to said main spindle axis and normal thereto; a stationary third tool carrier disposed on the side of said first tool carrier facing away from said first chuck means, said third tool carrier carrying at least one tool holder for holding a tool; said first tool carrier turret being mounted such that by appropriate first and second adjustment of said first cross slide means and appropriate first and second indexing of said first tool carrier turret, respectively, said auxiliary spindle axis can be brought into axial alignment with said main spindle axis and a workpiece held by said second chuck means may approach said tool held by said tool holder of the third tool carrier.*

*11. The automatic lathe according to claim 10, in which the indexing axis of the first tool carrier turret is inclined at an angle α relative to the main spindle axis, and a tool held by the third tool carrier forms an angle of 180° − 2α with the main spindle axis.*

*12. The automatic lathe according to claims 10 or 11 in which the third tool carrier has a rotatable and drivable tool holder.*

*13. The automatic lathe according to claim 10 in which the stationary third tool carrier comprises an indexable tool turret.*

*14. The automatic lathe according to claim 10, in which said third tool carrier carries a plurality of tool holders each of which can be approached by a workpiece held by said second chuck means by appropriate adjustment of said first cross slide means and appropriate indexing of said first tool carrier turret.*

* * * * *